US009791637B2

United States Patent
Danley et al.

(10) Patent No.: US 9,791,637 B2
(45) Date of Patent: Oct. 17, 2017

(54) METHODS OF TERMINATING ONE OR MORE OPTICAL FIBERS

(71) Applicant: CORNING OPTICAL COMMUNICATIONS LLC, Hickory, NC (US)

(72) Inventors: Jeffrey Dean Danley, Hickory, NC (US); Robert Bruce Elkins, II, Hickory, NC (US); Darrin Max Miller, Hickory, NC (US); Dennis Craig Morrison, Lincolnton, NC (US); Kipp David Yeakel, Waverly, NY (US)

(73) Assignee: Corning Optical Communications LLC, Hickory, NC (US)

( * ) Notice: Subject to any disclaimer, the term of this patent is extended or adjusted under 35 U.S.C. 154(b) by 91 days.

(21) Appl. No.: 14/687,237

(22) Filed: Apr. 15, 2015

(65) Prior Publication Data

US 2015/0301292 A1  Oct. 22, 2015

Related U.S. Application Data

(60) Provisional application No. 61/981,952, filed on Apr. 21, 2014.

(51) Int. Cl.
*G02B 6/38* (2006.01)

(52) U.S. Cl.
CPC .................. *G02B 6/3861* (2013.01)

(58) Field of Classification Search
CPC .. G02B 6/3812; G02B 6/3861; G02B 6/3833; G02B 6/245; G02B 6/02395;

(Continued)

(56) References Cited

U.S. PATENT DOCUMENTS 3,861,781 A * 1/1975 Hasegawa ............ G02B 6/3855
385/60
4,135,781 A 1/1979 Archer ......................... 350/96.2
(Continued)

FOREIGN PATENT DOCUMENTS

JP  54050343 A  4/1979  ............... G02B 5/14
JP  59109014 A  6/1984  ............... G02B 7/26
(Continued)

OTHER PUBLICATIONS

European Search Report, Application No. 15164011.7-1504, Dec. 1, 2015, 7 pages.

*Primary Examiner* — Vishal I Patel
(74) *Attorney, Agent, or Firm* — Adam R. Weeks

(57) ABSTRACT

A method of terminating an optical fiber involves providing a ferrule having a front end, a rear end, a ferrule bore extending between the front and rear ends, and a bonding agent disposed in at least a portion of the ferrule bore. The method also involves applying energy to heat the bonding agent. An end section of an optical fiber is inserted into the ferrule bore and through the bonding agent when the bonding agent is heated. The end section of the optical fiber includes a primary coating prior to insertion into the ferrule bore. During insertion of the end section of the optical fiber through the bonding agent, the heated bonding agent thermally removes at least a portion of the primary coating during so that the optical fiber can be secured in the ferrule bore with the bonding agent.

12 Claims, 6 Drawing Sheets

(58) Field of Classification Search
CPC .... G02B 6/105; G02B 6/3889; G02B 6/3854; Y10T 156/10
See application file for complete search history.

(56) References Cited

U.S. PATENT DOCUMENTS

| | | | |
|---|---|---|---|
| 4,147,402 A | 4/1979 | Chown | 350/96.18 |
| 4,158,477 A | 6/1979 | Phillips et al. | 350/96.21 |
| 4,168,109 A | 9/1979 | Dumire | 350/96.22 |
| 4,198,119 A | 4/1980 | Uberbacher | 350/96.2 |
| 4,345,930 A | 8/1982 | Basola et al. | 65/102 |
| 4,510,005 A | 4/1985 | Nijman | 156/221 |
| 4,678,268 A | 7/1987 | Russo et al. | 350/96.18 |
| 4,859,827 A | 8/1989 | Coyle, Jr. et al. | 219/121.64 |
| 4,932,989 A | 6/1990 | Presby | 65/2 |
| 4,984,865 A | 1/1991 | Lee et al. | 350/96.2 |
| 5,011,254 A | 4/1991 | Edwards et al. | 350/96.18 |
| 5,101,090 A | 3/1992 | Coyle, Jr. et al. | 219/121.68 |
| 5,226,101 A | 7/1993 | Szentesi et al. | 385/85 |
| 5,256,851 A | 10/1993 | Presby | 219/121.69 |
| 5,291,570 A | 3/1994 | Filgas et al. | 385/78 |
| 5,317,661 A | 5/1994 | Szentesi et al. | 385/31 |
| 5,421,928 A | 6/1995 | Knecht et al. | 156/153 |
| 5,682,451 A * | 10/1997 | Lee | G02B 6/3812 385/56 |
| 5,772,720 A | 6/1998 | Taira-Griffin et al. | 65/387 |
| 5,954,974 A | 9/1999 | Broer et al. | 216/2 |
| 5,966,485 A | 10/1999 | Luther et al. | 385/85 |
| 5,968,283 A | 10/1999 | Walraven et al. | 134/19 |
| 6,128,927 A | 10/2000 | Ahrens et al. | 65/392 |
| 6,139,196 A | 10/2000 | Feth et al. | 385/97 |
| 6,246,026 B1 | 6/2001 | Vergeest | 219/121.72 |
| 6,282,349 B1 | 8/2001 | Griffin | 385/81 |
| 6,361,219 B1 | 3/2002 | Blyler, Jr. et al. | 385/85 |
| 6,413,450 B1 | 7/2002 | Mays, Jr. | 264/1.27 |
| 6,492,443 B1 | 12/2002 | Kodemura et al. | 524/114 |
| 6,509,547 B1 | 1/2003 | Bernstein et al. | 219/121.68 |
| 6,534,741 B2 | 3/2003 | Presby | 219/121.69 |
| 6,738,544 B2 | 5/2004 | Culbert et al. | 385/33 |
| 6,742,936 B1 | 6/2004 | Knecht et al. | 385/67 |
| 6,774,341 B2 | 8/2004 | Ohta | 219/121.72 |
| 6,805,491 B2 | 10/2004 | Durrant et al. | 385/76 |
| 6,817,785 B2 | 11/2004 | Tian | 385/96 |
| 6,822,190 B2 | 11/2004 | Smithson et al. | 219/121.69 |
| 6,825,440 B2 | 11/2004 | Ohta et al. | 219/121.69 |
| 6,886,991 B2 | 5/2005 | Endo | 385/78 |
| 6,888,987 B2 | 5/2005 | Sercel et al. | 385/39 |
| 6,902,327 B1 | 6/2005 | Johnson | 385/60 |
| 6,939,055 B2 | 9/2005 | Durrant et al. | 385/76 |
| 6,951,994 B2 | 10/2005 | Mays, Jr. | 219/121.69 |
| 6,955,478 B2 | 10/2005 | Durrant et al. | 385/76 |
| 6,957,920 B2 | 10/2005 | Luther et al. | 385/85 |
| 6,960,627 B2 | 11/2005 | Huth et al. | 525/59 |
| 6,963,687 B2 | 11/2005 | Vergeest et al. | 385/123 |
| 6,968,103 B1 | 11/2005 | Schroll et al. | 385/30 |
| 7,023,001 B2 | 4/2006 | Cournoyer et al. | 250/492.1 |
| 7,029,187 B2 | 4/2006 | Chapman et al. | 385/96 |
| 7,082,250 B2 | 7/2006 | Jones et al. | 385/134 |
| 7,121,734 B2 | 10/2006 | Taira | 385/78 |
| 7,142,741 B2 | 11/2006 | Osborne | 385/15 |
| 7,147,384 B2 | 12/2006 | Hardcastle et al. | 385/60 |
| 7,216,512 B2 | 5/2007 | Danley et al. | 65/392 |
| 7,264,403 B1 | 9/2007 | Danley et al. | 385/60 |
| 7,267,491 B2 | 9/2007 | Luther et al. | 385/85 |
| 7,306,376 B2 | 12/2007 | Scerbak et al. | 385/76 |
| 7,324,723 B2 | 1/2008 | Shioda et al. | 385/31 |
| 7,324,724 B2 | 1/2008 | Levesque et al. | 385/31 |
| 7,341,383 B2 | 3/2008 | Droege et al. | 385/78 |
| 7,377,700 B2 | 5/2008 | Manning et al. | 385/72 |
| 7,419,308 B2 | 9/2008 | Ma | 385/54 |
| 7,452,137 B2 | 11/2008 | Droege et al. | 385/60 |
| 7,509,004 B2 | 3/2009 | Coleman | 385/33 |
| 7,540,668 B2 | 6/2009 | Brown | 385/78 |
| 7,630,609 B1 | 12/2009 | Mays, Jr. et al. | 385/137 |
| 7,695,201 B2 | 4/2010 | Douglas et al. | 385/85 |
| 7,802,927 B2 | 9/2010 | Benjamin et al. | 385/88 |
| 8,052,836 B2 | 11/2011 | Cale et al. | 156/712 |
| 8,101,885 B2 | 1/2012 | Nakamae et al. | 219/121.77 |
| 8,104,974 B1 | 1/2012 | Gurreri | 385/72 |
| 8,109,679 B2 | 2/2012 | Danley et al. | 385/85 |
| 8,132,971 B2 | 3/2012 | Luther et al. | 385/83 |
| 8,480,311 B2 | 7/2013 | Ohtsuka et al. | 385/78 |
| 8,696,215 B1 | 4/2014 | Fewkes et al. | |
| 8,702,322 B1 * | 4/2014 | Danley | G02B 6/3861 385/76 |
| 2002/0186934 A1 | 12/2002 | Hug et al. | 385/80 |
| 2004/0047567 A1 | 3/2004 | Gimbel et al. | 385/80 |
| 2004/0234211 A1 | 11/2004 | Durrant et al. | 385/88 |
| 2005/0008307 A1 | 1/2005 | Culbert et al. | 385/123 |
| 2005/0213891 A1 | 9/2005 | Hardcastle et al. | 385/60 |
| 2005/0284852 A1 | 12/2005 | Vergeest et al. | 219/121.67 |
| 2006/0137403 A1 | 6/2006 | Barr et al. | 65/377 |
| 2006/0266743 A1 | 11/2006 | Chi et al. | 219/121.69 |
| 2008/0067158 A1 | 3/2008 | Levesque | 219/121.72 |
| 2010/0101277 A1 | 4/2010 | Gonthier et al. | 65/392 |
| 2010/0215319 A1 | 8/2010 | Childers et al. | 385/60 |
| 2010/0220960 A1 | 9/2010 | Ohtsuka et al. | 385/72 |
| 2010/0284654 A1 | 11/2010 | Ohtsuka et al. | |
| 2010/0303416 A1 | 12/2010 | Danley et al. | 385/55 |
| 2012/0014649 A1 | 1/2012 | Duis et al. | 385/65 |
| 2012/0027356 A1 | 2/2012 | Gurreri | 385/60 |
| 2012/0027358 A1 | 2/2012 | Webb et al. | 385/78 |
| 2012/0128303 A1 | 5/2012 | Koyama et al. | 385/60 |
| 2013/0089294 A1 | 4/2013 | Zimmel | 385/80 |
| 2013/0343709 A1 | 12/2013 | Danley et al. | 385/81 |
| 2014/0321811 A1 * | 10/2014 | Miller | G02B 6/3833 385/75 |

FOREIGN PATENT DOCUMENTS

| | | | |
|---|---|---|---|
| JP | 2010134102 A | 6/2010 | |
| JP | 2010266822 A | 11/2010 | G02B 6/36 |
| JP | 2011002821 A | 1/2011 | G02B 6/00 |
| JP | 201315790 A | 1/2013 | G02B 6/36 |
| WO | WO 95/30915 A2 | 11/1995 | |
| WO | WO 01/61394 A1 | 8/2001 | G02B 6/26 |
| WO | WO 01/61395 A1 | 8/2001 | G02B 6/26 |
| WO | WO 01/61870 A2 | 8/2001 | |
| WO | WO 2004/003612 A1 | 1/2004 | G02B 6/25 |
| WO | WO 2008/103239 A1 | 8/2008 | B23K 26/00 |
| WO | 2013192303 A1 | 12/2013 | |

* cited by examiner

METHODS OF TERMINATING ONE OR MORE OPTICAL FIBERS

PRIORITY APPLICATION

This application claims the benefit of priority under 35 U.S.C. §119 of U.S. Provisional Application Ser. No. 61/981,952, filed on Apr. 21, 2014, the content of which is relied upon and incorporated herein by reference in its entirety.

BACKGROUND

The disclosure relates generally to optical fibers, and more particularly to methods of of terminating one or more optical fibers with a ferrule positioned within or intended for a fiber optic connector.

Optical fibers are useful in a wide variety of applications, including the telecommunications industry for voice, video, and data transmissions. In a telecommunications system that uses optical fibers, there are typically many locations where fiber optic cables that carry the optical fibers connect to equipment or other fiber optic cables. To conveniently provide these connections, fiber optic connectors are often provided on the ends of fiber optic cables. The process of terminating individual optical fibers from a fiber optic cable is referred to as "connectorization." Connectorization can be done in a factory, resulting in a "pre-connectorized" or "pre-terminated" fiber optic cable, or the field (e.g., using a "field-installable fiber optic connector).

Regardless of where installation occurs, a fiber optic connector typically includes a ferrule with one or more bores that receive one or more optical fibers. The ferrule supports and positions the optical fiber(s) with respect to a housing of the fiber optic connector. Thus, when the housing of the fiber optic connector is mated with another fiber optic connector or adapter, an optical fiber in the ferrule is positioned in a known, fixed location relative to the housing. This allows an optical connection to be established when the optical fiber is aligned with another optical fiber provided in the mating component (the other fiber optic connector or adapter).

Ferrules bores typically have a size that is only slightly larger than a "bare" optical fiber to provide fixed positional relationship mentioned above. The term "bare" is used because optical fibers, which may be glass or plastic, are normally surrounded by one or more protective coatings/layers. Thus, removal of the coating(s) is typically required prior to inserting an optical fiber into a ferrule bore.

Various methods are available to remove the coating(s) from an optical fiber, including mechanical stripping, chemical stripping, hot gas stripping, and laser stripping. Each of these methods presents its own challenges. For example, mechanical stripping includes physically removing coating material from the optical fiber with a semi-sharp edge of a blade, which has the potential to damage the optical fiber and can require time-consuming inspection and replacement procedures for the blade. Chemical stripping uses chemicals to dissolve coating material, but the chemicals may require extensive procedures to protect the environment and safety measures. Hot-gas stripping uses a heated jet of gas (e.g., nitrogen or air) to melt and remove material, which can be difficult to control and may result in considerable debris. Laser stripping involves using one or more laser beams to vaporize or ablate coating material, but can require complex and expensive equipment to distribute the laser energy around the optical fiber in a desired manner.

In addition, once coating material is removed from an end section of an optical fiber using any of the above-mentioned methods, the optical fiber may be vulnerable to damage. A stripped (i.e., bare) optical fiber may be damaged merely by being in contact with particulates, which may scratch or damage an exterior surface of the optical fiber where coating material has been removed. Any stripping process completed prior to insertion of the optical fiber into a ferrule must be managed carefully so that the stripped optical fiber is not damaged prior to being protected within the ferrule.

SUMMARY

One example of a method of terminating an optical fiber involves providing a ferrule having a front end, a rear end, a ferrule bore extending between the front and rear ends, and a bonding agent disposed in at least a portion of the ferrule bore. The method also involves applying energy to heat the bonding agent. An end section of an optical fiber is inserted into the ferrule bore and through the bonding agent when the bonding agent is heated. The end section of the optical fiber includes a primary coating prior to insertion into the ferrule bore. During insertion of the end section of the optical fiber through the bonding agent, the heated bonding agent thermally removes at least a portion of the primary coating during. Finally, the method involves securing the optical fiber in the ferrule bore with the bonding agent.

In a more specific example of the above-described method, the ferrule bore includes a first section extending inwardly from the rear end of the ferrule and having a first width, a second section extending inwardly from the front end of the ferrule and having a second width is less than the first width, and a transition section located between the first section and the second section. The bonding agent is at least partially located in the transition section prior to or when the ferrule is provided. The end section of the optical fiber is at least partially exposed to the bonding agent after thermally removing at least a portion of the outer coating from the end section, and the end section pulls at least some of the bonding agent into the second section of the ferrule bore when the end section is inserted through the bonding agent.

Additional features and their advantages will be set forth in the detailed description which follows, and in part will be readily apparent to those skilled in the art from the description or recognized by practicing the embodiments as described in the written description and claims hereof, as well as the appended drawings.

It is to be understood that both the foregoing general description and the following detailed description are merely exemplary, and are intended to provide an overview or framework to understand the nature and character of the claims.

BRIEF DESCRIPTION OF THE DRAWINGS

The accompanying drawings are included to provide a further understanding, and are incorporated in and constitute a part of this specification. The drawings illustrate one or more embodiment(s), and together with the description serve to explain principles and operation of the various embodiments. Persons skilled in the technical field of optical connectivity will appreciate how features and attributes associated with embodiments shown in one of the drawings may be applied to embodiments shown in others of the drawings.

DETAILED DESCRIPTION

Figure 1:
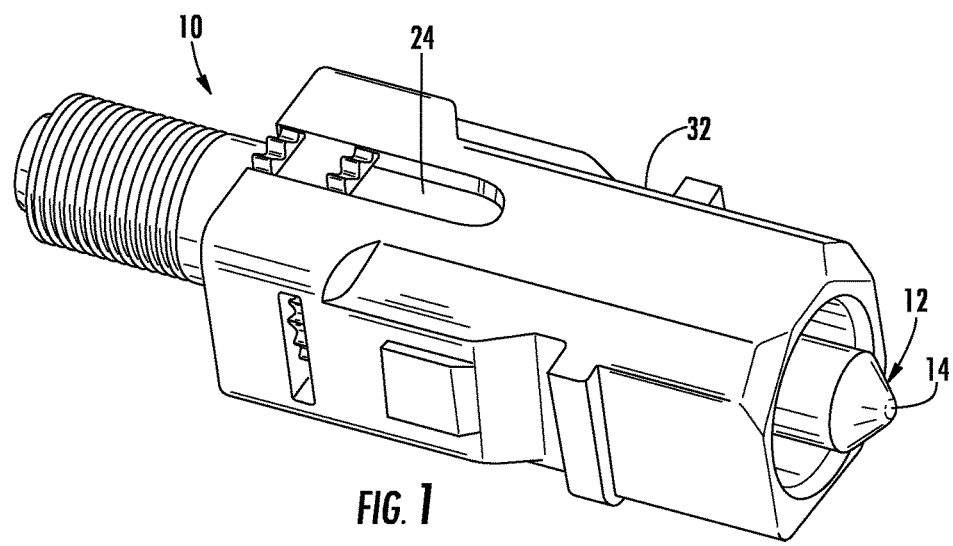
FIG. 1 a perspective view of an example of a fiber optic connector.

Various embodiments will be further clarified by examples in the description below. In general, the description relates to methods terminating an optical fiber (i.e., one or more optical fibers) with a ferrule of a fiber optic connector. The methods may be part of a cable assembly process for a fiber optic cable. That is, the methods may be part of terminating one or more optical fibers from a fiber optic cable with a fiber optic connector to form a cable assembly. One example of a fiber optic connector ("connector") 10 for such a cable assembly is shown in FIG. 1. Although the connector 10 is shown in the form of a SC-type connector, the methods described below may be applicable to processes involving different fiber optic connector designs. This includes ST, LC, FC, MU, and MPO-type connectors connectors, for example, and other single-fiber or multi-fiber connector designs. A general overview of the connector 10 and an exemplary optical fiber will be provided simply to facilitate discussion.

Figure 2:
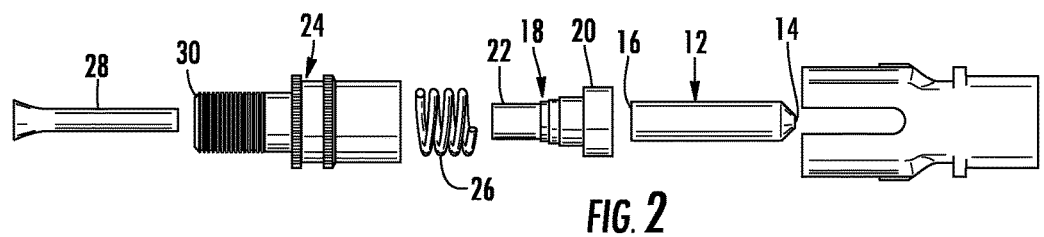
FIG. 2 is an exploded side view the fiber optic connector of FIG. 1.

As shown in FIGS. 1 and 2, the connector 10 includes a ferrule 12 having a front end 14 ("mating end") and rear end 16 ("insertion end"), a ferrule holder 18 having opposed first and second end portions 20, 22, and a housing 24 (also referred to as "inner housing 24", "retention body 24", "crimp body 24", or "connector body 24"). The rear end 14 of the ferrule 12 is received in the first end portion 20 of the ferrule holder 18 while the front end 14 remains outside the ferrule holder 18. The second end portion 22 of the ferrule holder 18 is received in the housing 24. A spring 26 may be disposed around the second end portion 22 and configured to interact with walls of the housing 24 to bias the ferrule holder 18 (and ferrule 12). Additionally, a lead-in tube 28 may extend from a rear end of the housing 24 to within the second end portion 22 of the ferrule holder 18 to help guide the insertion of an optical fiber (not shown in FIGS. 1 and 2) into the ferrule 12. An outer shroud 32 (FIG. 1; also referred to as an "outer housing") is positioned over the assembled ferrule 12, ferrule holder 18, and housing 24 (also referred to as an "inner housing"), with the overall configuration being such that the front end 16 of the ferrule 12 presents an endface configured to contact a mating component (e.g., another fiber optic connector; not shown).

In a manner not shown herein, a fiber optic cable providing the optical fiber also includes one or more layers of material (e.g., strength layer of aramid yarn) that may be crimped onto a rear end portion 30 of the housing 24, which is why the housing 24 may be referred to as a "crimp body". A crimp band (or "crimp ring") may be provided for this purpose. Additionally, a strain-relieving boot may be placed over the crimped region and extend rearwardly to cover a portion of the fiber optic cable. Variations of these aspects will be appreciated by persons familiar with the design of fiber optic cable assemblies. Again, the embodiment shown in FIGS. 1 and 2 is merely an example of a fiber optic connector that may be used in the methods described below.

Figure 3:
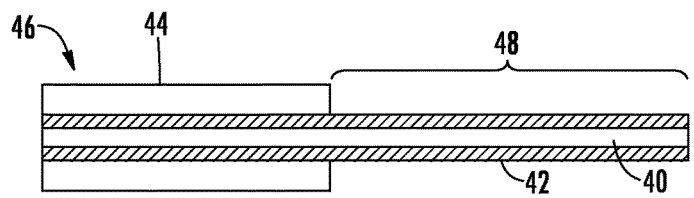
FIG. 3 is a schematic view of a portion of fiber optic cable that includes an optical fiber, a primary coating applied to the optical fiber, and a buffer layer applied to the primary coating, with some of the buffer layer having been removed from an end section of the optical fiber and primary coating.

FIG. 3 illustrates an example of an optical fiber 40 upon which the connector 10 may be installed. The optical fiber 40 guides light through a principle known as "total internal reflection," where light waves are contained within a core by a cladding that has a different index of refraction than the core. The core and cladding are not labeled in FIG. 3, but together define the optical fiber 40 and may comprise glass (e.g., germanium-doped silica). One or more coating layers surround the optical fiber 40 to protect the optical fiber 40 from the environment and mechanical loads. In the embodiment shown, a primary coating 42 surrounds the optical fiber 40, and a secondary coating 44 is applied to the primary coating 42. The primary coating 42 may, for example, comprise an acrylic polymer, have an outer diameter of 250 μm, and simply be referred to as "the coating". The secondary coating 44 may, for example, comprise polyvinyl chloride or polyurethane, have an outer diameter of 900 μm, and be referred to as a "tight buffer" layer. The optical fiber 40 and coating layer(s) represent part of a fiber optic cable 46 that may or may not include other optical fibers.

Typically the coating layer(s) are removed from a section of the optical fiber 40 before installing a connector. In FIG. 3, the secondary coating 44 has been removed from the primary coating 42 over an end section 48 of the optical fiber. The secondary coating 44 may be removed by conventional techniques, such as by mechanically stripping with tools designed for this purpose. Although the primary coating 42 may be removed using conventional stripping techniques as well, the methods described below contemplate a different approach, namely one involving thermal energy.

Figure 4:
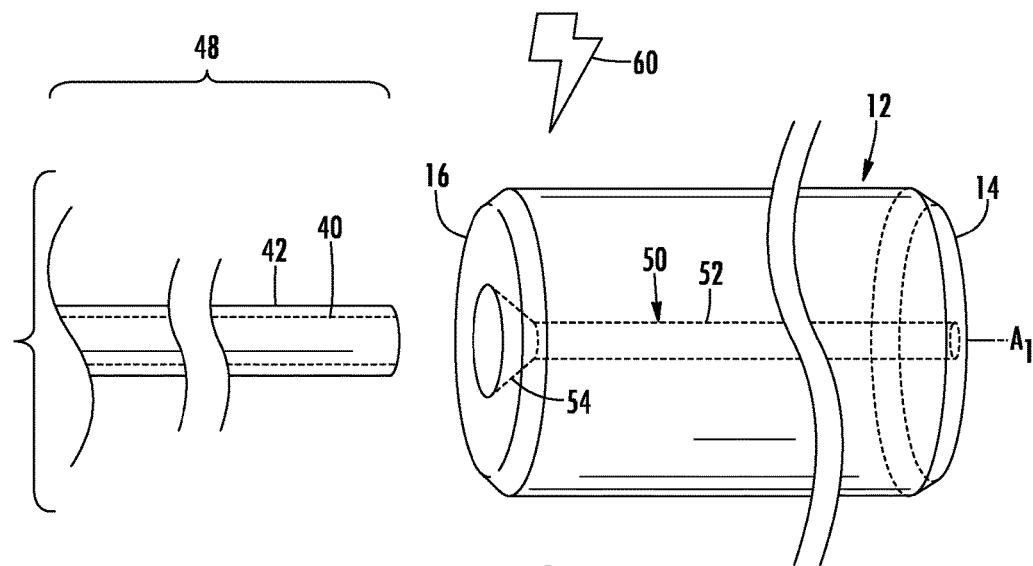
FIG. 4 is a side perspective view of the end section of the optical fiber in FIG. 3 adjacent to a rear opening of a ferrule bore of a heated ferrule.
Figure 5:
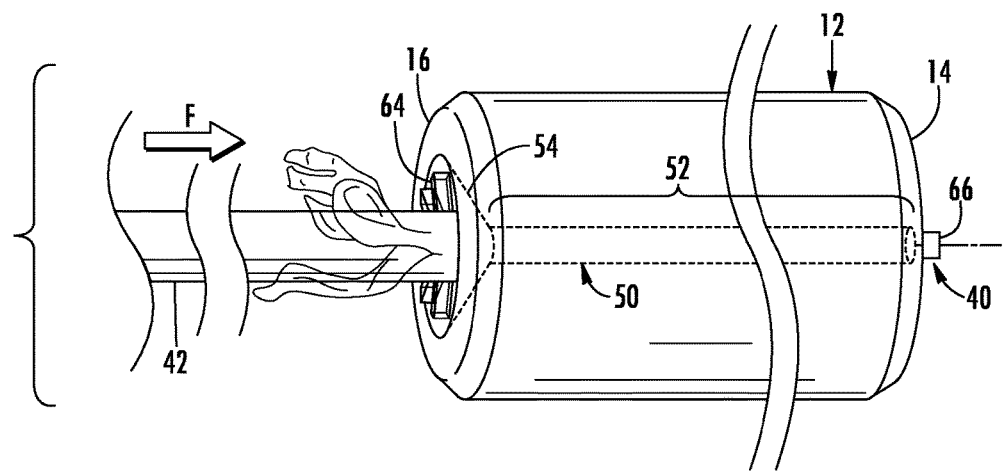
FIG. 5 is a side perspective view similar to FIG. 4, but showing the end section of the optical fiber being inserted into the ferrule bore through the rear opening and some of the primary coating being removed from the optical fiber during this insertion.

To this end, FIGS. 4 and 5 schematically illustrate one example of such a method. Although the ferrule 12 is shown in isolation in FIGS. 4 and 5, the method may be performed when the connector 10 (FIG. 1) is assembled or partially assembled (e.g., the ferrule 12 being received in the ferrule holder 18, and in some embodiments, the ferrule holder 18 even being positioned in the housing 24). The ferrule 12 includes a ferrule bore 50 extending from the rear end of the ferrule 12 to the front end 14. The end section 48 of the optical fiber 40—with the primary coating 42 still present—is prepared to be inserted into the ferrule bore 50, such as by bringing the optical fiber 40 into alignment with a longitudinal axis $A_1$ of the ferrule bore 50. The optical fiber 40 is sized to be received within a micro-hole section 52 (or simply "micro-hole") of the ferrule bore 50, while the primary coating 42 is not. Stated differently, the micro-hole section 52 of the ferrule bore 50 has an inner diameter $D_{FB}$ that is larger than of an outer diameter $D_{OF}$ of the optical fiber 40 but smaller than an outer diameter $D_{PC}$ of the primary coating 42. The inner diameter $D_{FB}$ may be within 10 μm of the outer diameter $D_{OF}$ in some embodiments. A transition section 54 that decreases in diameter (or width) along an axial length may be provided in the ferrule bore 50 to help guide the optical fiber 40 into the micro-hole section 52.

Prior to and/or during insertion of the optical fiber 40 into the ferrule bore 50, energy is applied to the ferrule 12 in the form of heat. An energy source or heating device 60 is shown generically in FIG. 4 because different embodiments may use different sources/techniques to apply heat to the ferrule 12. For example, the energy source 60 may comprise at least one laser, such as a carbon dioxide, quantum cascade, semiconductor, or ultraviolet excimer laser, as will be apparent based on the description of other examples below. In alternative embodiments, the energy source 60 may be an electrical or electromagnetic energy source designed for convection heat transfer or conduction heat transfer. The heat raises the temperature of at least a portion of the ferrule 12 and of a bonding agent (also referred to as an "adhesive composition"; not shown in FIGS. 4 and 5) that is disposed in the ferrule bore 50. In some embodiments, the bonding agent may be injected into the ferrule bore 50 prior to inserting the optical fiber 40. In other embodiments, the bonding agent 50 may be pre-loaded into the ferrule bore 12 by the manufacturer of the ferrule 12. Specific examples of the latter are described further below.

The ferrule 12 and bonding agent are heated to an elevated temperature, which may be a predetermined temperature based on the properties of the bonding agent and/or the primary coating 42 of the optical fiber 40. For example, the bonding agent may be heated above a curing temperature, melting temperature, or cross-linking temperature of the bonding agent. Alternatively or additionally, the bonding agent may be heated above a delamination temperature, melting temperature, oxidation temperature, ablation temperature, or other thermal degradation temperature of the primary coating 42. In one exemplary embodiment, the bonding agent is heated to an elevated temperature that is sufficient to change the primary coating 42 to a non-solid state.

Eventually the end section 48 of the optical fiber 40 is inserted with a force F into the ferrule bore 50 and through the heated bonding agent, as shown in FIG. 5. The force F may be, for example, less than 2 pounds and applied manually or by an automated actuator (not shown). The heated bonding agent thermally removes the primary coating 42 from the optical fiber 40 during the insertion of the optical fiber 40. As used herein, the phrase "thermally removes" or "thermally removed" refers to heat from the bonding agent and/or ferrule causing the primary coating 42 to at least partially separate or otherwise become free from the optical fiber 40. The primary coating 42 may, for example, be partially converted to a gas, oxidized, melted, and/or simply pushed backwards on the optical fiber 40 as the end section 48 is inserted into the ferrule bore 50. The inner diameter of the ferrule bore 50 being smaller than the outer diameter of the primary coating 42 facilitates the primary coating 42 being pushed away from the end section 48 of during the insertion of the optical fiber 40 and the thermal removal of the primary coating 42.

In the embodiment shown in FIG. 5, some of the primary coating 42 that has been thermally removed accumulates at the rear end 16 of the ferrule 12 to form a support body 64. The support body 64 may provide protection from harmful bending as the optical fiber 40 extends rearward from the rear end 16 of the ferrule 12.

Thermally removing the primary coating 42 from the end section 48 of the optical fiber 40 enables the bonding agent to more effectively secure the optical fiber 40 in the ferrule bore 50. More specifically, with the bonding agent still heated (i.e., still in a melted or otherwise thermally elevated state, even if heat is no longer applied by the energy source), the end section 48 of the optical fiber 50 may be inserted through the ferrule bore 50 until a terminal end 66 of the optical fiber 40 is flush (or substantially flush, such as within 20 μm or even within 10 μm) with the endface defined by the front end 14 of the ferrule 12 or until the terminal end 66 of the optical fiber 40 is protruding from the endface. The former be the case if the optical fiber 40 is intended to be cleaved and/or conventionally polished after being secured in the ferrule bore 50, while the latter may be the case if the optical fiber 40 is cleaved and/or polished prior to insertion into the ferrule bore 50 such that only minimal or no further polishing/processing on the terminal end 66 is required after being securing in the ferrule bore 50.

In terms of how the optical fiber 40 is secured within the ferrule bore 50, the bonding agent bonds the optical fiber 40 to an inner surface of the ferrule bore 50 upon cooling. Cooling the bonding agent may be achieved passively or actively. Accordingly, in some embodiments, cooling may simply be a matter of turning off or removing the energy source 60 (FIG. 4) so that the ferrule 12 and bonding agent are no longer heated, and then allowing the ferrule 12 and bonding agent to return to a temperature below the predetermined temperature. No powered devices (e.g., fans, pumps, etc.) are used to promote the heat transfer in such embodiments. In other embodiments, powered devices may be used to provide active cooling.

If the primary coating 42 were not removed, the bonding agent might not secure the optical fiber 40 to the inner surface with sufficient strength to withstand loads experienced by the connector 10/cable assembly. Additionally, the optical fiber 40 may not be as precisely located relative to the ferrule 12 if the primary coating 42 were not removed because the optical fiber 40 may not be centered within the primary coating 42 with sufficient accuracy. Precisely locating the optical fiber 40 relative to the ferrule 12 enables more reliable performance/optical coupling to an optical fiber in another ferrule.

To provide the above-mentioned advantages, in some embodiments at least 25% of the primary coating 42 may be thermally removed from the end section 48 of the optical fiber 40, or at least from an exterior surface of the end section 48 that is located within the micro-hole section 52 of the ferrule bore 50. Stated differently, at least 25% of an exterior surface of the end section 48 of the optical fiber 40 that is located within the micro-hole section 52 of the ferrule bore 50 may be free of the primary coating 42. In other embodiments, the percentage of the primary coating 42 that is thermally removed may be even greater, such as at least 50%, at least 75%, or at least 95%. In this manner, the end section 48 of the optical fiber 40 may be more effectively secured to the ferrule 12 by the bonding agent.

Figure 6:
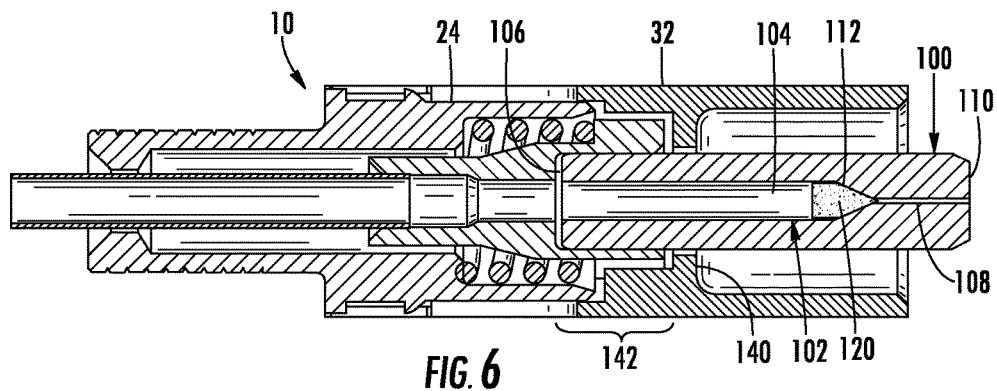
FIG. 6 is a cross-sectional view of a fiber optic connector according to another embodiment.

Certain ferrule designs may facilitate the methods described herein and, therefore, provide additional advantages. FIG. 6 illustrates an example of a ferrule 100 having such a design. In this embodiment, the ferrule 100 includes a ferrule bore 102 having a first section 104 extending inwardly from a rear end 106 ("insertion end" or "first end") of the ferrule 100, a second section 108 (also referred to as "micro-hole" or "micro-hole section") extending inwardly from a front end 110 ("mating end" or "second end") of the ferrule 100, and a transition section 112 located between the first section 104 and the second section 108. The first section 104 has a first width, and the second section 108 has a second width less than the first width such that the transition section 112 provides a decrease in width between the first section 104 and second section 108. More specifically, in the embodiment shown, the first section 104 of the ferrule bore 102 is a cylindrical bore extending from the rear end 106 of the ferrule 100 to the transition section 112 such that the first width is a first diameter. The second section 108 of the ferrule bore 102 is a cylindrical bore extending from the front end 110 of the ferrule 100 to the transition section 112 such that the second width is a second diameter. Accordingly, the transition section 112 provides a decrease in diameter between the first section 104 and second section 108.

Still referring to FIG. 6, a bonding agent 120 is at least partially located in the transition section 112 of the ferrule bore 102. The bonding agent 120 may be pre-loaded or stored within the ferrule 100 for a significant amount of time (e.g., at least an hour, a day, a year, etc.) before inserting an optical fiber into the ferrule bore 102. For example, as mentioned above, the bonding agent 120 may be pre-loaded into the ferrule bore 102 by the manufacturer of the ferrule 100. In these and other embodiments, the bonding agent 120 may be a solid material, such as a solid powder, configured to melt when heated above certain temperatures. The bonding agent 120 may therefore be an adhesive plug positioned within the transition section 112 of the ferrule bore 102 and substantially blocking an entrance to the second section 108 of the ferrule bore 102. Additional details about exemplary bonding agents are provided further below. First, however, an exemplary method of melting of the bonding agent 120 and using the melted bonding agent to strip a primary coating from an optical fiber will be described to better illustrate the advantages provided by the design of the ferrule 100.

The method is generally shown in FIGS. 6-11, which use the same reference numbers to refer to elements already described in connection with other embodiments. The ferrule 100 is shown as being positioned within the connector 10 prior to melting the bonding agent 120. To this end, the connector 10 may be configured to be used in conjunction with a heating system that focuses heat onto the ferrule in such a way that the bonding agent 120 is melted without the rear end 106 and/or approximately the first third of the ferrule 100 adjacent the rear end 106 reaching a temperature high enough to damage the outer housing 32 and/or inner housing 24. Although a particular heating system will be described, other heating systems and techniques may be used in alternative embodiments.

Figure 7:
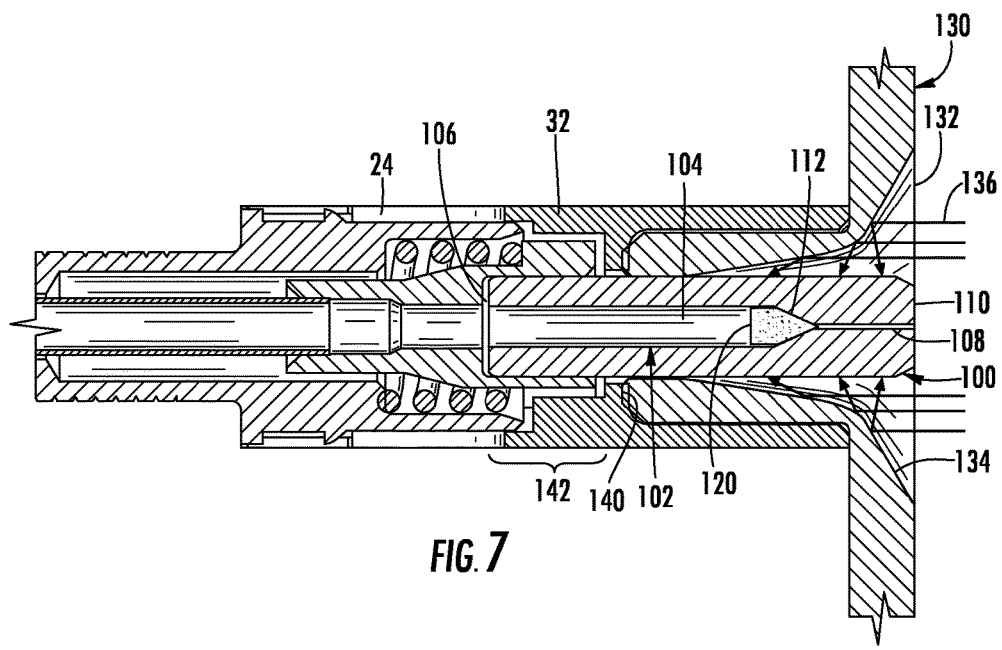
FIG. 7 is a cross-sectional view similar to FIG. 6, but showing a portion of the fiber optic connector being heated to melt a bonding agent in a ferrule of the fiber optic connector.

With this in mind, FIG. 7 illustrates the ferrule 100 being supported by a heating port 130 that includes an opening 132 and reflector 134 surrounding the opening 132. The reflector 134 includes angled reflective surfaces that are positioned relative to the ferrule 100 to focus heat onto a portion of the ferrule 100 to melt the bonding agent 120. For example, the heating may be accomplished by $CO_2$ laser beams 136 that are focused by the reflector 44 onto a portion of the ferrule 100 that includes the bonding agent 120 and potentially the second section 108 of the ferrule bore 102. This portion of the ferrule 100 may be a front half or a front third of the ferrule 100 in some embodiments. In this manner, the bonding agent 120 may be melted while the heating of other areas of the ferrule 100 (e.g., a rear half or rear third of the ferrule 100) is limited. Specific examples of heating will now be described to further illustrate this aspect.

In some embodiments, during heating, the portion of the ferrule 100 including the bonding agent 120 (and the bonding agent 120 itself) is heated to a temperature above 250° C. while the temperature of the rear end 106 of the ferule 100, the ferrule holder 18, the inner housing 24, and/or the outer housing 32 remain below 250° C., or even below 200° C. A more specific example involves heating the portion of the ferrule 100 including the bonding agent 120 (and the bonding agent 120 itself) to a temperature in the range of 250-400° C. while the temperature of the rear end 106 of the ferule 100, the ferrule holder 18, the inner housing 24, and/or the outer housing 32 remains below 250° C., or even below 200° C. An even more specific example involves heating the portion of the ferrule 100 including the bonding agent 120 (and the bonding agent 120 itself) to a temperature in the range of 280-360° C. while the temperature of the rear end 106 of the ferrule 100, the ferrule holder 18, the inner housing 24, and/or the outer housing 32 remains below 250° C., or even below 200° C. The melting temperature of the bonding agent 120 may fall within the temperature range to which the ferrule 100 is heated, as may a temperature at which the bonding agent 120 cross-links (discussed below) in the presence of air. In some embodiments, the bonding agent 120 may be heated above its melting temperature but below the temperature at which the bonding agent 120 cross-links in the presence of air. For example, a bonding agent with a melting temperature of about 270° C. (or less) and a cross-linking temperature of about 330° C. (or greater) may be heated to a temperature in the range of about 280-300° C. Regardless, and as mentioned above, keeping the rear end 106 of the ferrule 100 at a lower temperature than the portion including the bonding agent 120 reduces the likelihood of damaging other nearby components of the connector 10, such as the outer housing 32 and/or inner housing 24.

Examples of illustrating this aspect can be expressed in even further detail by referring to more than simply the rear end 106 of the ferrule 100. For example, in the embodiment shown, the outer housing 32 includes a clamping member 140. The ferrule 100 includes an inner portion 142 located inward from clamping member 140 within the outer housing 32. In FIG. 7, the inner portion 142 of the ferrule 100 is the portion of the ferrule 100 located to the left of the clamping member 140. During heating and melting of the bonding agent 120, the inner portion 142 of the ferrule 100 may be maintained below a temperature that will damage the outer housing 32 and inner housing 32, and below the temperature to which the bonding agent 120 is heated. Thus, during heating, the portion of the ferrule 100 including the bonding agent 120 (and the bonding agent 120 itself) may be heated to a temperature above 250° C. while the temperature of the inner portion 142 of the ferrule 100 remains below 250° C., or even below 200° C. In embodiments where the portion of the ferrule 100 including the bonding agent 120 (and the bonding agent 120 itself) is heated to a temperature in the range of 250-400° C. (or 280-360° C. in some embodiments, or even more specifically 340-360° C. in some embodiments), the inner portion 142 of the ferrule 100 may remain below 250° C., or even below 200° C.

Advantageously, the larger diameter of first section 104 (compared to the smaller diameter of second section 108) results in a large portion of the volume of the ferrule 100 being filled with air, and the air within the ferrule 100 may act as a buffer or insulator to heat transfer along the length of the ferrule 100. Thus, the insulating effect of the air within the first section 104 may contribute to maintaining the inner portion 142 of the ferrule 100 at a low temperature during heating, as discussed above. It should be understood that the temperature to which the portion of the ferrule 100 including the bonding agent 120 is heated may be based upon the melting temperature of the particular bonding agent located within in the ferrule 100.

Figure 8:
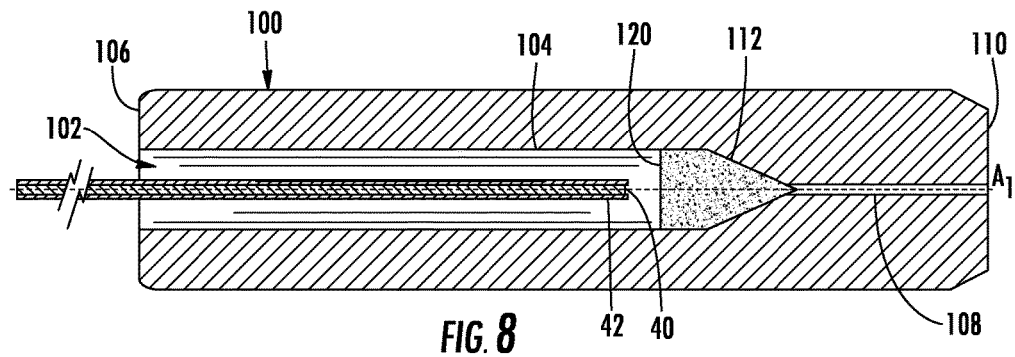
FIG. 8 is a cross-sectional view of an end section of an optical fiber being inserted into the ferrule of the fiber optic connector of FIG. 6, with the end section having a primary coating surrounding the optical fiber.
Figure 9:
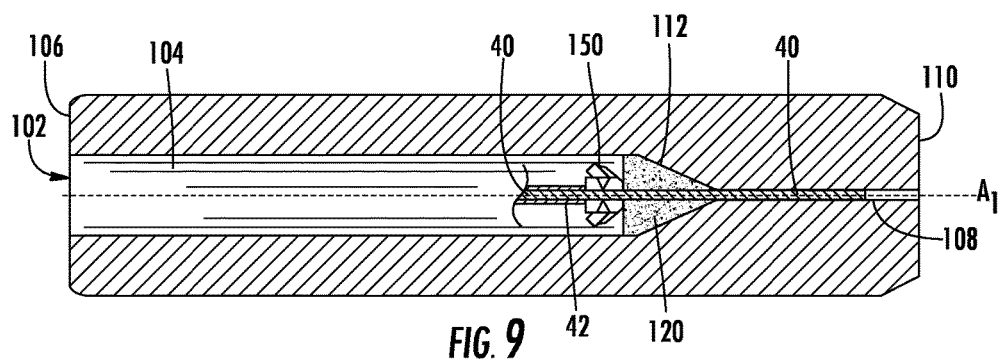
FIG. 9 is a cross-sectional view similar to FIG. 8, but showing the end section of the optical fiber being inserted through the heated bonding agent to thermally removed the primary coating from the optical fiber.
Figure 9A:
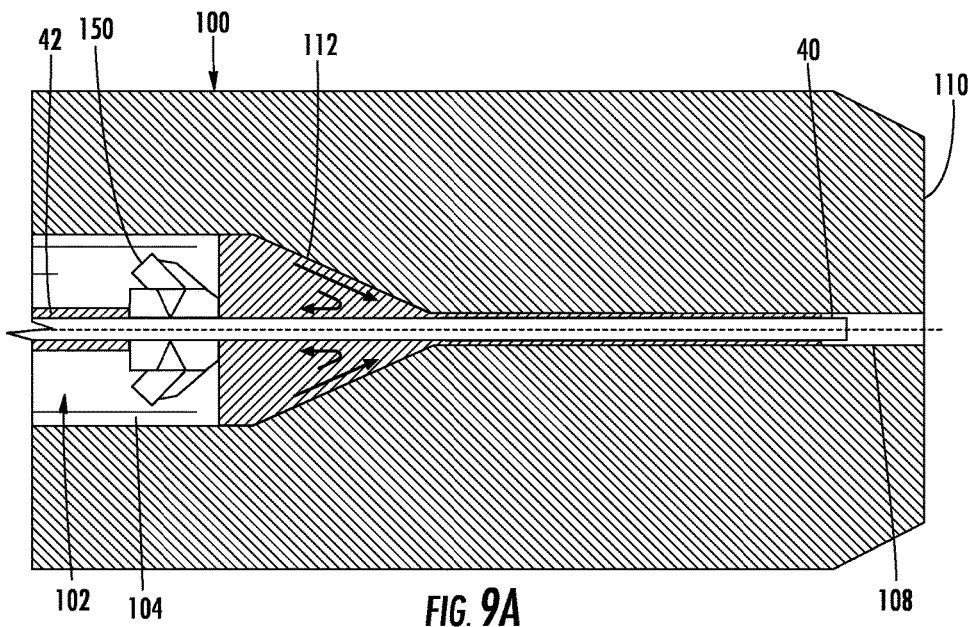
FIG. 9A is a more detailed view of a portion of FIG. 9.

Referring to FIGS. 8 and 9, once the bonding agent 120 has been heated above its melting temperature, the bonding agent 120 becomes a flowable adhesive material, allowing an optical fiber 40 to be inserted through the ferrule bore 102. As shown, the optical fiber 40—with the primary coating 42 still present—is inserted into the ferrule bore 102 in the direction from the rear end 106 toward the front end 110. The optical fiber 40 passes through the first section 104 and then encounters the flowable adhesive material (i.e., the bonding agent 120 in a melted state). FIGS. 9 and 9A illustrate how the bonding agent 120 thermally removes the primary coating 42 from the optical fiber 40 when the optical fiber 40 passes through the bonding agent 120. The thermal removal of the primary coating 42 at least partially exposes the end section 48 of the optical fiber 40 to the bonding agent 120, thereby allowing the end section 48 to pull at least some of the bonding agent 120 into the second section 108 of the ferrule bore 102.

As with the embodiment shown in FIGS. 4 and 5, some of the primary coating that has been thermally removed accumulates to form a support body 150 that may provide protection from harmful bending of the optical fiber 40. In embodiment shown in FIGS. 9 and 9A, however, the support body 150 is located within the ferrule 100. This helps prevent the support body 150 from interfering with the assembly of the connector 10. Therefore, providing the ferrule bore 102 with a first section 104 that has a larger diameter not only allows for advantageous heating of the ferrule 100 (discussed above), but also allows for advantageous placement/capture of thermally removed material. These advantages apply even if the thermally removed material does not form a support body 150 or otherwise provide protection from bending of the optical fiber 40.

Still referring to FIGS. 9 and 9A, it can be seen how the optical fiber 40 enters the second section 108 of the ferrule bore 102 after insertion through the bonding agent 120 and after thermal removal of the primary coating 42. The inner diameter of the second section 108 may be smaller than the outer diameter of the primary coating 42 to facilitate the primary coating 42 being pushed away from the end section 48 of the optical fiber 40 during the insertion. As mentioned above, the end section 48 of the optical fiber 40 pulls at least some of the bonding agent 120 into the second section 108 of the ferrule bore 102. The shape of the transition section 112 may facilitate this aspect, particularly when the transition section 112 includes a frustoconical inner surface, by acting as a funnel and directing the bonding agent 120 into the second section 108 of the ferrule bore 102 along with the end section 48 of the optical fiber 40. Providing geometry to facilitate the desired fluid dynamics is particularly beneficial for the design of the ferrule 100 because the reduced length of the second section 108 compared to the ferrule bore 102 as a whole means that there is less overall surface area available for the bonding agent 120 to secure the end section 48 of the optical fiber 40. More effectively filling any space between the end section 48 of the optical fiber 40 and the inner surface of the second section 108 may help lead to a more effective bonding.

Figure 10:
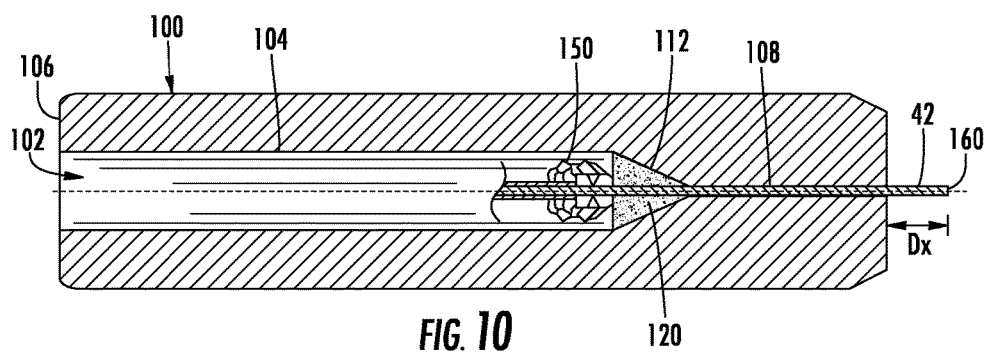
FIG. 10 is a cross-sectional view similar to FIG. 9, but showing the end section of the optical fiber being inserted completely through the ferrule so that a terminal end of the optical fiber extends past an endface of the ferrule.
Figure 11:
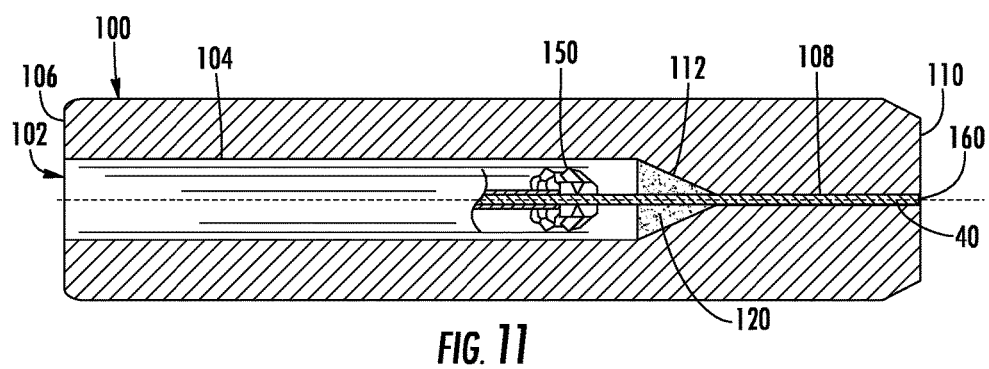
FIG. 11 is a cross-sectional view similar to FIG. 9, but showing the terminal end of the optical fiber being positioned proximate the endface of the ferrule.

Additionally or alternatively, the optical fiber 40 may inserted into the ferrule bore 102 and through the bonding agent 120 in a particular manner to promote bonding with the section section 108 of the ferrule bore 102. For example, FIGS. 10 and 11 illustrate the end section 48 of the optical fiber 40 being inserted completely through the ferrule bore 102 so that a terminal end 160 of the optical fiber 40 extends a distance $D_x$ past the front end 110 of the ferrule 100 (FIG. 10), and thereafter retracting the optical fiber 40 to bring the terminal end 160 proximate the front end 110 of the ferrule 100 (FIG. 11). The distance $D_x$ may be, for example, at least 0.5 mm, at least 1 mm, at least 2 mm, or even at least 5 mm in some embodiments to ensure that a sufficient amount of the bonding agent 120 is drawn into the second section 108 of the ferrule bore 102 and/or to ensure that a sufficient amount of the primary coating 42 is thermally removed from the portion of the optical fiber 40 that is ultimately located within the second section 108. In these and other embodiments, the optical fiber 40 and/or ferrule 100 may be rotated during insertion of the optical fiber 40 to further promote thermal removal of the primary coating 42 and/or drawing the bonding agent 120 into the second section 108 of the ferrule bore 102.

The final position of the terminal end 160 of the optical fiber 40 in relation to the front end 110 of the ferrule 100, regardless of whether the optical fiber 40 is inserted a distance $D_x$ past the front end 110 of the ferrule 100 and retracted, may depend upon whether further processing steps are desired. As with the embodiment discussed above with reference to FIGS. 4 and 5, the terminal end 160 of the optical fiber 40 may be made flush (or substantially flush, such as within 20 μm or even within 10 μm) with the endface defined by the front end 110 of the ferrule 100, which may be the case if the optical fiber 40 is cleaved and/or polished prior to insertion into the ferrule bore 102. Alternatively, the terminal end 160 of the optical fiber 40 may be left protruding from the endface of the ferrule (e.g., by 20 μm-50 μm or more), which may be the case if the optical fiber 40 is intended to be cleaved and/or conventionally polished after being secured in the ferrule bore 102.

Also like the embodiment discussed above with reference to FIGS. 4 and 5, the ferrule 100 may be actively cooled, for example by blowing air, to speed the cooling and solidification process. In other embodiments, the ferrule 100 may be passively cooled, for example by simply allowing the ferrule 100 and the flowable adhesive material to return to a temperature at which the bonding agent 120 solidifies. Additional steps to finish assembling the connector 10 and/or cable assembly may be performed following solidification if necessary.

Figure 12:
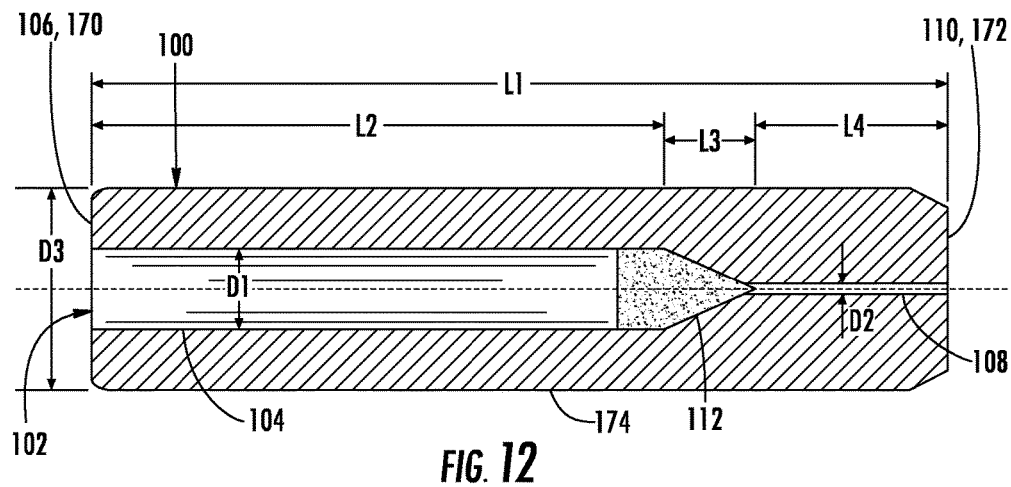
FIG. 12 is a cross-sectional view showing the ferrule of the fiber optic connector of FIG. 6 in isolation, prior to be heated.

Having described how the design of the ferrule 100 generally facilitates the methods described herein and provides unique advantages, additional details and examples of the ferrule 100 will now be provided. As shown in FIG. 12, the rear and front ends 106, 110 of the ferrule 100 define respective endfaces 170, 172 extending in planes that are parallel or substantially parallel to each other. In other embodiments, the endfaces 170, 172 may extend in planes at an angle to each other and/or be non-planar surfaces, such as convex or concave surfaces. The first diameter of the first section 104 of the ferrule bore 102 is shown as D1, and the second diameter of the second section 108 of the ferrule bore 102 is shown as D2. The ferrule 100 is substantially cylindrical with an outer surface 174 having an outer diameter D3. In other embodiments, the first section 104, section 108, and outer surface 174 may have non-circular cross-sectional shapes (e.g., elliptical, square, rectangular, triangular, etc.), and in such embodiments, the first section 104, section 108, and outer surface 174 may have widths that substantially match the various embodiments of D1, D2 and D3 discussed herein.

In addition to the benefits already mentioned above, the larger nature of the first diameter D1 may allow for the easy or efficient insertion of the bonding agent 120 into the ferrule bore 102 to form an adhesive plug. The first diameter D1 may be defined in relation to the second diameter D2 and/or outer diameter D3 to provide these benefits. For example, D1 may be between 20% and 80% of D3, between 20% and 60% of D3, or between 30% and 50% of D3. In one specific embodiment, D may be about 40% of D3. Alternatively or additionally, D1 may be greater than twice D2, greater than four times D2, or between 7 and 9 times D2.

The transition section 112 of the ferrule bore 100 has a decreasing diameter from left to right in the orientation of FIG. 12 (e.g., the diameter of the transition section 112 decreases as the distance to front end 110 decreases). In the embodiment shown, the transition section 112 is a frustoconical-shaped section having an inner surface positioned at an angle A relative to the longitudinal axis $A_1$ of the ferrule bore 102. In various embodiments, angle A may be between 30° and 80°, or specifically between 50° and 70°, and even more specifically be about 60°.

Although FIG. 12 shows the transition section 112 of the ferrule bore 102 as a frustoconical, tapered section having a diameter that is proportional (e.g., linearly related) to the distance to the endface 172, in other embodiments the inner surface may have other shapes that generally have variable widths/diameters to provide a decrease in width/diameter as the distance to the front end 110/endface 172 decreases. For example, the inner surface may include steps of decreasing diameter or may be a surface having a continuously curved but nonlinear relation to the distance to the endface 172. As noted above, the decreasing diameter of the transition section 112 helps funnel melted adhesive material into the second end section 108 of the ferrule bore 102 and also acts to guide the end section 48 of the optical fiber 40 into the second section 108 during insertion.

The relative lengths of the ferrule 100, first section 104, second section 108, and transition section 112 may further contribute to the functionalities discussed herein. For example, the relative lengths may structurally allow for the placement of the bonding agent 120 adjacent the second section 108. As discussed above, such placement may allow the ferrule 100 to be heated to melt the bonding agent 120 while limiting heating of an inner portion 142 of the ferrule 100.

FIG. 12 illustrates the ferrule 100 having an axial length L1, the first section 104 of the ferrule bore 102 having an axial length L2, the transition section 112 having an axial length L3, and the second section 108 having an axial length L4. L2 is greater than L3 and L4, and L4 is greater than L3. In some embodiments, L2 may be greater than 50% of L1, greater than 55% of L1, or even greater than 60% of L1. L2 may be, for example, between 50% and 70% of L1. In these or other embodiments, L4 may be less than 40% of L1, less than a third of L1, or even less than 30% of L1. L4 may be, for example, between 20% and 40% of L1. Also in these or other embodiments, L3 may be less than 30% of L1, less than 20% of L1, or even less than 10% of L1. L3 may be, for example, between 5% and 15% of L1.

The bonding agent 120, which is shown in FIG. 12 in a solid state (i.e., as an adhesive plug), is primarily located within the transition section 112 but may also have a small portion extending into the second section 108. Further, in the embodiment shown, all of the bonding agent 120 is located within the ferrule bore 102 between an axial midpoint and the front end 110. Prior to melting the bonding agent 120, at least 80%, or at least 90%, or even further, at least 95% of the bonding agent 120 may be located between the axial midpoint and the second section 108 (i.e., the end of the transition section 112). And in various embodiments, more than 50% of the bonding agent 120 may be located within the transition section 112.

The transition section 112 and first section 104 of the ferrule bore 102 provide a storage area for the bonding agent 120 prior to heating and flowing into second section 108. Indeed, the bonding agent 120 may include particles or pellets of adhesive material having an average diameter sufficiently large compared to the second diameter of the second section 108 such that placement of the adhesive material into second section 108 prior to melting is not practical. For example, in certain embodiments, the average diameter of adhesive particles of the adhesive material may be greater than 25% of D2, greater than 50% of D2, or even greater than 75% of D2.

As mentioned above, the ferrule 100 may be pre-loaded with the bonding agent 120 at a time and/or location distant from the time and place of securing the optical fiber 40 within the ferrule 100. For example, the bonding agent 120 may be loaded into the ferrule 100 at a first physical location or facility (e.g., a ferrule manufacturing facility). The ferrule 100 pre-loaded with the bonding agent 120 may then be shipped to a second physical location or facility that couples the ferrule 100 to an optical fiber. Thus, the bonding agent 120 remains within the ferrule 100 as an adhesive plug during handling, shipping, packaging, etc. The bonding agent 120 may be, for example, a solid powder material that is coupled within the transition section 112 via compression (i.e., packed into the transition section 112 to form an adhesive plug). Alternatively, the bonding agent 120 may be extruded or injection molded into the transition section 112 to form an adhesive plug. The ferrule 100 may contain the bonding agent 120 for a long period of time before heating, such as 8 hours, 16 hours, 1 day, 1 week, 1 month, 6 months, 1 year, or even several years.

Now that additional details and examples of the ferrule 100 have been described, additional details and examples of the bonding agent 120 will be provided. As can be appreciated, a bonding agent that heats and cools quickly may help reduce the overall time associated with the methods disclosed herein. The bonding agent should, however, also provide sufficient coupling between the end section 48 of the optical fiber 40 and the second section 108 of the ferrule bore 102. One specific example of such a bonding agent is one that comprises a partially cross-linked polymer resin and a coupling agent that provides chemical coupling between the polymer resin and the optical fiber 40, the ferrule 100, or both. The presence of the coupling agent allows the polymer resin to be selected primarily for heating and cooling properties rather than adhesion properties. The bonding agent may even comprise a majority of the polymer resin so as to be largely characterized by the heating and cooling properties of the polymer resin. For example, the bonding agent may comprise between about 0.1 to about 10 parts by weight of the coupling agent per 100 parts by weight of the partially cross-linked polymer resin.

As used herein, "cross-linked" or "cross-linking" refers to the chemical bonding that connects a polymer chain to an adjacent polymer chain; "partially cross-linked" is where not all adjacent chains are bonded; and "partially cross-linkable" describes a chemical species that becomes partially cross-linked when sufficient heat is applied. It should be understood that the terms "partially cross-linked" and "partially cross-linkable" describe the same polymer resin before or after partially cross-linking. For example, a polymer resin may be described as partially cross-linkable when it is loaded into a ferrule and has not yet been heated. Following heating, the polymer resin may be partially cross-linked.

One example of a partially cross-linked polymer resin with the desired heating and cooling characteristics mentioned above includes poly(phenylene sulfide). One example of a coupling agent having the desired adhesion characteristics mentioned above is a coupling agent having a silane functional group, such as one or more of the following: an alkoxysilane, an oxime silane, an acetoxy silane, a zirconate, a titanate, a silane with an epoxy ring on one end and trimethoxy functional group at the other end, or combinations thereof. Other examples of partially cross-linked polymers, coupling agents, and bonding agents in general are described in U.S. Pat. No. 8,696,215, the disclosure of which (and particularly the examples of bonding agents/adhesive compositions) is incorporated herein by reference.

Persons skilled in optical connectivity will appreciate additional variations/modifications of the elements disclosed herein. Such persons will also appreciate variations/modifications of the methods involving the elements disclosed herein, including the order in which the method steps are performed. To this end, where a method claim below does not actually recite an order to be followed by its steps or it is not otherwise specifically stated in the claims below or description above that the steps are to be limited to a specific order, it is no way intended that any particular order be inferred.

What is claimed is:

1. A method of terminating an optical fiber, comprising:
   providing a ferrule having a front end, a rear end, a ferrule bore extending between the front and rear ends, and a bonding agent disposed in at least a portion of the ferrule bore;
   applying energy to heat the bonding agent;
   inserting an end section of an optical fiber into the ferrule bore and through the bonding agent when the bonding agent is heated, wherein the end section of the optical fiber includes a primary coating prior to insertion into the ferrule bore, and further wherein the heated bonding agent thermally removes at least a portion of the primary coating during insertion of the end section of the optical fiber through the bonding agent; and
   securing the optical fiber in the ferrule bore with the bonding agent;
   wherein:
   the ferrule bore includes a first section extending inwardly from the rear end of the ferrule and having a first width, a second section extending inwardly from the front end of the ferrule and having a second width is less than the first width, and a transition section located between the first section and the second section;
   the bonding agent is at least partially located in the transition section;
   the end section of the optical fiber is at least partially exposed to the bonding agent after thermally removing at least a portion of the primary coating from the end section; and
   the end section of the optical fiber pulls at least some of the bonding agent into the second section of the ferrule bore when the end section is inserted through the bonding agent.

2. A method according to claim 1, wherein the optical fiber is secured in the ferrule bore with the bonding agent by allowing the bonding agent to cool after the bonding agent has been heated.

3. A method according to claim 1, wherein the transition section of the ferrule bore includes a frustoconical inner surface configured to facilitate directing the bonding agent into the second section of the ferrule bore as the end section of the optical fiber is inserted through the bonding agent and into the second section of the ferrule bore.

4. A method according to claim 1, wherein:
   the first section of the ferrule bore is a cylindrical bore extending from the rear end of the ferrule to the transition section and the first width is a first diameter;
   the second section of the ferrule bore is a cylindrical bore extending from the front end of the ferrule to the transition section and the second width is a second diameter;
   the first diameter is at least twice the second diameter;
   an axial length of the first section is greater than half an axial length of the ferrule; and
   an axial length of the second section is greater than an axial length of the transition section and less than a third of the axial length of the ferrule.

5. A method according to claim 4, wherein the ferrule has an outer diameter, and further wherein the first diameter of the first section of the ferrule bore is greater than 30% of the outer diameter of the ferrule.

6. A method according to claim 1, wherein the bonding agent is a solid powdered adhesive composition coupled to the transition section via compression of the solid powdered adhesive composition within the transition section.

7. A method according to claim 1, wherein primary coating that has thermally removed from the optical fiber forms accumulated material, the method further comprising:
   storing the accumulated material in the first section of the ferrule bore.

8. A method according to claim 1, wherein inserting the end section of the optical fiber into the ferrule bore and through the bonding agent further comprises:
   inserting the end section of the optical fiber completely through the ferrule bore so that an end of the optical fiber extends at least 1 mm past the front end of the ferrule; and
   thereafter retracting the optical fiber to bring the end of the optical fiber to within about 50 microns of the front end of the ferrule.

9. A method according to claim 1, wherein inserting the end section of the optical fiber into the ferrule bore and through the bonding agent further comprises:
   rotating the optical fiber, the ferrule, or both the optical fiber and the ferrule.

10. A method according to claim 1, further comprising:
    at least partially assembling a fiber optic connector that includes the ferrule, wherein the ferrule is at least partially positioned within one or more housings of the fiber optic connector when applying energy to heat the bonding agent.

11. A method according to claim 1, wherein applying energy to heat the bonding agent comprises heating the portion of the ferrule including the bonding agent to a first temperature, the rear end of the ferrule remaining below the first temperature when the ferrule is heated.

12. A method according to claim 1, wherein applying energy to heat the bonding agent comprises heating the portion of the ferrule including the bonding agent to a first temperature, and further wherein a first third of the ferrule extending inwardly from the rear end of the ferrule remains below the first temperature when the ferrule is heated.

* * * * *